United States Patent [19]

Kirchner et al.

[11] 3,843,654

[45] Oct. 22, 1974

[54] 3-AMINO-2,3-DIHYDRO-4(1H) QUINAZOLINONES

[75] Inventors: Frederick K. Kirchner, Bethlehem; Andrew W. Zalay, Albany, both of N.Y.

[73] Assignee: Sterling Drug, Inc., New York, N.Y.

[22] Filed: July 7, 1969

[21] Appl. No.: 839,708

Related U.S. Application Data

[63] Continuation-in-part of Ser. No. 553,052, May 26, 1966, abandoned, which is a continuation-in-part of Ser. No. 441,922, March 22, 1965, abandoned, which is a continuation-in-part of Ser. No. 153,227, Nov. 17, 1961, Pat. No. 3,375,250.

[52] U.S. Cl..... 260/256.4 F, 260/243 B, 260/247.1, 260/247.2 A, 260/256.4 Q, 260/256.5 R, 260/999

[51] Int. Cl............................................. C07d 51/48

[58] Field of Search... 260/256.4 Q, 256.4 F, 256.5, 260/247.1, 247.2, 243 B

[56] References Cited
UNITED STATES PATENTS 3,375,250   3/1968   Kirchner et al................. 260/256. 4

*Primary Examiner*—Richard J. Gallagher
*Attorney, Agent, or Firm*—Elmer J. Lawson; Thomas L. Johnson; Robert K. Bair

[57] ABSTRACT

3-Amino-2,3-dihydro-4(1H)-quinazolinones having a spiro-cycloalkane or spiro-heterocyclic group attached to the 2-position are prepared by interacting anthranilic acid hydrazide or a derivative thereof with a cyclic ketone. The use of a keto acid such as levulinic acid in place of the cyclic ketone gives related quinazolinones having fused heterocyclic rings. The products are useful as sedatives.

16 Claims, No Drawings

3-AMINO-2,3-DIHYDRO-4(1H) QUINAZOLINONES

This application is a continuation-in-part of our copending application Ser. No. 553,052, filed May 26, 1966 (now abandoned) which in turn is a continuation-in-part of our copending application Ser. No. 441,922, filed Mar. 22, 1965 and now abandoned, which in turn is a continuation-in-part of our copending application Ser. No. 153,227, filed Nov. 17, 1961 and now U.S. Pat. No. 3,375,250, issued Mar. 26, 1968.

This invention relates to new and useful heterocyclic compounds of the class of 4(1H)-quinazolinones.

In one of its aspects, the invention comprises 3-amino-2,3-dihydro-4(1H)-quinazolinones of the formula I

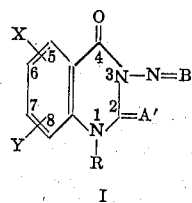

I wherein:
B is
1. any pair of the monovalent groups R,
2. a divalent group A', or
3. the group =C=A';

R is H, lower-alkyl, lower-alkenyl, cycloalkyl, cycloalkyl-lower-alkyl, Ar, or Ar-lower-alkyl where Ar is phenyl or phenyl substituted by from one to three substituents selected from lower-alkyl, lower-alkoxy, lower-alkylmercapto, lower-alkanesulfinyl, lower-alkanesulfonyl, halogen, nitro or trifluoromethyl;

A' is polymethylene, azapolymethylene, N-lower-alkyl-azapolymethylene, oxapolymethylene, or thiapolymethylene each containing from three to eight carbon atoms; and, X and Y are each H, lower-alkyl, lower-alkoxy, lower-alkylmercapto, lower-alkanesulfinyl, lower-alkanesulfonyl, halogen, nitro or trifluoromethyl.

In formula I, A' is a divalent group consisting of a polymethylene chain which can be interrupted by an O, S or N atom. The compounds of the invention thus have a spiro substituent attached at the 2-position of the quinazolinone ring. Examples of the divalent groups A', include polymethylene, azapolymethylene, N-alkylazapolymethylene, oxapolymethylene, or thiapolymethylene containing from three to eight carbon atoms, and include, for example, trimethylene, tetramethylene, pentamethylene, hexamethylene, heptamethylene, $-CH_2-CH_2-O-CH_2-CH_2-$, $-CH_2-CH_2-S-CH_2-CH_2-$, $-CH_2-CH_2-NH-CH_2-CH_2-$, $-CH_2-CH_2-N(lower-alkyl)-CH_2-CH_2-$, $-CH_2-CH_2-CH_2-NH-CH_2-CH_2-$ and $-CH_2-C(CH_3)_2-NH-C(CH_3)_2-CH_2-$.

In formula I, in the definitions of R, A', X, Y and Ar, the lower-alkyl or lower-alkane group is a straight- or branched-chain saturated acyclic hydrocarbon radical containing from one to six carbon atoms. Lower-alkyl or lower-alkane groups are represented by, for example, methyl, ethyl, n-propyl, n-butyl, isopropyl, isobutyl, sec.-butyl, tert.-butyl, n-amyl, and n-hexyl radicals.

In formula I, in the definition of R, the lower-alkenyl group is a straight- or branched-chain acyclic hydrocarbon radical containing at least one double bond and having from two to six carbon atoms in the chain. Lower-alkenyl groups are represented by, for example, vinyl, allyl, propenyl, 2-butenyl, 3-methylpropenyl, methallyl, 2,4-pentadienyl, 3-hexenyl, and the like.

In formula I, in the definition of R, the cycloalkyl group is a saturated cyclic hydrocarbon radical containing from three to eight ring carbon atoms. Cycloalkyl groups are represented by, for example, cyclopropyl, cyclobutyl, cyclopentyl, cyclohexyl, 4-methylcyclohexyl, cycloheptyl, cyclooctyl, and the like.

In formula I, in the definition of Ar when representing substituted-phenyl, the phenyl radicals have from one to three said substituents which can be in any of the available positions of the phenyl nucleus, and where more than one substituent is present, they can be the same or different and they can be in any of the various position combinations relative to each other.

The terms X and Y in formula I can be the same or different and include H, lower-alkyl, lower alkoxy, lower-alkylmercapto, lower-alkanesulfinyl, lower-alkanesulfonyl, halogen, and nitro, wherein lower-alkyl is as defined above and lower-alkane hereinused is equivalent in meaning to lower-alkyl. The terms X and Y are, for example, but are not limited to H, methyl, ethyl, n-propyl, isopropyl, n-butyl, isobutyl, tert.-butyl, n-amyl, n-hexyl, methoxy, ethoxy, methanesulfinyl, methylmercapto, methanesulfonyl, ethane-sulfonyl, chloro, bromo, fluoro, iodo, nitro, or trifluoromethyl.

Ar-lower-alkyl, in the definition of R in formula I, is the unsubstituted-phenyl or said substituted-phenyl radical as defined above, bonded through a divalent saturated acyclic hydrocarbon radical. Examples of Ar-lower-alkyl radicals include, but are not limited to, benzyl, 4-chlorobenzyl, 3,4-dichlorobenzyl, 2-phenylethyl, 2-phenylpropyl, 3-(4-methoxyphenyl)propyl, 1-phenyl-1-ethyl, and the like.

In formula I the cycloalkyl-lower-alkyl group is a cycloalkyl group as defined above bonded through a divalent saturated acyclic hydrocarbon radical. Examples of cycloalkyl-lower-alkyl radicals include, but are not limited to, cyclopropylmethyl, cyclobutylmethyl, 2-cyclohexylethyl, 3-cyclopentylpropyl, and cyclooctyl-methyl.

The compounds of formula I are prepared by reacting a compound of the formula II

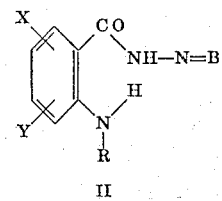

II with a compound of the formula A'=O, wherein R, A', N=B, X, and Y are as defined above. Cyclization of the anthranilic acid hydrazide with an aldehyde or ketone bonds the two secondary nitrogen atoms (shown in formula II) through a common carbon atom, resulting in the formation of the quinazolinone ring.

Cyclization of anthranilic acid hydrazide itself, that is, the compound of formula II wherein X and Y are each hydrogen and N=B is the primary amino radical, NH₂, with an aldehyde or ketone, A'=O, produces a 3-amino-2,3-dihydro-4(1H)-quinazolinone (formula III)

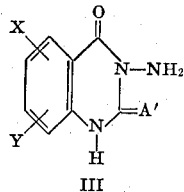

III and this compound can be reacted with an alkylating agent to produce a compound of formula I wherein N=B is NRR, i.e., formula IV

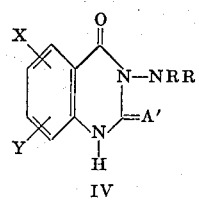

IV and with an aldehyde or ketone to produce compounds of formula I wherein N=B is N=C=A', i.e., formula V

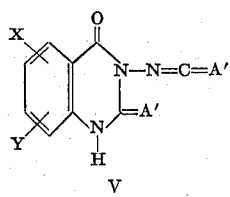

V

Alternatively, a substituted anthranilic acid hydrazide, wherein N=B in formula II is a secondary- or tertiary-amino radical or an imino radical, can also be cyclized to produce the compounds of formula I. For example, N₁-anthranilyl-N₂-benzal hydrazone of formula VI

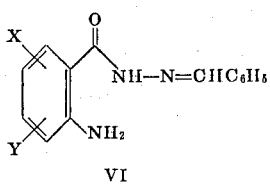

VI can be reacted with benzaldehyde to produce 2-phenyl-2,3-dihydro-3-benzalimino-4(1H)-quinazolinone.

When an anthranilic acid hydrazide of formula II is reacted with a cyclic ketone, for example cyclohexanone or N-methylpiperidone, a 2-spiro-2,3-dihydro-4(1H)-quinazolinone results.

When anthranilic acid hydrazide reacts with two molar equivalents of aldehyde or ketone the corresponding alkylideneimino-2,3-dihydro-4(1H)-quinazolinone can be obtained directly.

Aldehydic and ketonic reactants containing additional functional substituents can be used in the reaction to produce compounds of the invention of a more varied nature. For example, the reaction of anthraniloyl hydrazide with levulinic acid affords a product (formula VII) in which two cyclization reactions have taken place, that is,

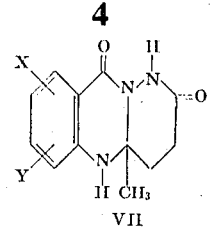

VII wherein the 3-[2-(2-methyl-2,3-dihydro-4(1H)-quinazolinyl)]-propionic acid which theoretically formed first recyclized with the formation of an internal hydrazide.

Similarly, anthranilic acid-N,N-dimethyl hydrazide can be reacted with levulinic acid to give the product (formula VIII) in which a second cyclization has taken place with the secondary nuclear nitrogen, i.e.

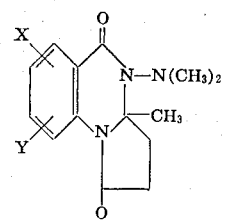

VIII

The anthranilic acid hydrazides, or anthraniloyl hydrazides, are a known class of compounds and can be obtained by standard methods by the reaction of hydrazine, hydrazine hydrate, or substituted hydrazines with isatoic anhydride or substituted isatoic anhydride, esters of anthranilic acid or substituted anthranilic acid, anthraniloyl halides or substituted anthraniloyl halides, or by the reduction of 2-nitrobenzoyl hydrazides or substituted 2-nitrobenzoylhydrazides.

Since many mono-substituted hydrazines other than phenylhydrazines are not readily available, it is convenient to prepare substituted anthraniloyl hydrazides by reduction of the appropriate anthraniloyl hydrazone resulting from the reaction of the anthraniloyl hydrazide with an aldehyde or ketone. Thus, N-isopropylanthraniloyl hydrazide is conveniently prepared by reacting anthraniloyl hydrazide with acetone and reducing the resulting hydrazone with, for example, hydrogen over a platinum catalyst.

The cyclization of an anthraniloyl hydrazide with an aldehyde or ketone is carried out in a suitable inert solvent preferably in the presence of a catalytic quantity of a strong acid, for example, p-toluenesulfonic acid, hydrogen chloride, sulfuric acid, or their equivalents. Suitable inert solvents are for example the lower aliphatic alcohols, benzene, toluene, chloroform, and the like. In certain instances the reactant itself can serve as a solvent, as the case of acetone. The reaction proceeds well at the reflux temperature of the solvent, that is, from about 50° to about 150°C., and in most cases is complete within about 2 hours.

The molecular structures of the compounds of the invention were assigned on the basis of study of their infrared spectral analysis taken with their mode of synthesis, and were corroborated by the correspondence of calculated and found values of elemental analyses of representative samples.

The following examples will further illustrate the invention.

EXAMPLE 1

2,2-Pentamethylene-2,3-dihydro-3-anilino-4(1H)-quinazolinone — A solution containing 8 g. of anthraniloyl phenylhydrazide, 5.2 ml. of cyclohexanone and a crystal of p-toluenesulfonic acid in 150 ml. of toluene was refluxed for 1 hour under a water trap. The crystals of 2,2-pentamethylene-2,3-dihydro-3-anilino-4(1H)-quinazolinone which separated from the cooled reaction mixture melted at 230.4–243.0°C. (corr.).

EXAMPLE 2

6-Bromo-2,2-pentamethylene-3-anilino-4(1H)-quinazolinone — Following the procedure given in Example 1, 9.2 g. of 5-bromoanthraniloyl phenylhydrazide was reacted with 5.2 ml. of cyclohexanone in 150 ml. of benzene containing a crystal of p-toluenesulfonic acid. The pure 6-bromo-2,2-pentamethylene-3-anilino-4(1H)-quinazolinone, after recrystallization from acetone, melted at 216.4°–217.6°C. (corr.).

EXAMPLE 3

2,2-Pentamethylene-3-cyclohexylidenamino-2,3-dihydro-4(1H)-quinazolinone — Following the procedure given in Example 1, 15.2 g. of anthraniloyl hydrazide was reacted with 20.5 ml. of cyclohexanone and a crystal of p-toluene-sulfonic acid in 150 ml. of toluene. The crystals of 2,2-pentamethylene-3-cyclohexylidenamino-2,3-dihydro-4(1H)-quinazolinone which separated from the cooled reaction mixture, was washed with toluene and ether, and melted indefinitely starting at 183.4°C. (corr.).

EXAMPLE 4

2,2-Pentamethylene-3-cyclohexylamino-2,3-dihydro-4(1H)-quinazolinone — A solution containing 15.35 g. of 2,2-pentamethylene-3-cyclohexylidenamino-2,3-dihydro-4(1H)-quinazolinone dissolved in 700 ml. of methanol was hydrogenated for 6 hours at 60° over 1.5 g. of 10 percent palladium-charcoal. Upon evaporation of the filtered solution to 150 ml., crystals of 2,2-pentamethylene-3-cyclohexylamino-2,3-dihydro-4(1H)-quinazolinone separated which when recrystallized from methanol melted at 230.6°–236.8°C. (corr.).

EXAMPLE 5

3-Amino-2,3-dihydro-spiro[quinazoline-2,4'-(1'-methyl)piperidine]-4(1H)-one — A mixture of 15.2 g. of anthraniloyl hydrazide and 11.3 g. of 1-methyl-4-piperidone was heated to 120°. The viscous solution which resulted was cooled to a resin and was crystallized from ether. After recrystallization from methanol-ether, the white crystals of 3-amino-2,3-dihydro-spiro[quinazoline-2,4'-(1-methyl)piperidine]-4(1H)-one thus prepared melted at 176.4°–178.0°C. (corr.).

EXAMPLE 6

2,2-Pentamethylene-3-dimethylamino-2,3-dihydro-4(1H)-quinazolinone — Following the procedure given in Example 1, a solution containing 9.2 g. of N,N-dimethylanthraniloyl hydrazide, 6.12 ml. of cyclohexanone, and a crystal of p-toluenesulfonic acid dissolved in 160 ml. of benzene was refluxed under a water separator until the calculated quantity of water was collected. The 2,2-pentamethylene-3-dimethylamino-2,3-dihydro-4(1H)-quinazolinone thus prepared, after two recrystallizations from methanol, melted at 201.8°–203°C. (corr.).

EXAMPLE 7

2.2-Pentamethylene-2,3-dihydro-3-isonicotinoylamino-4(1H)-quinazolinone — Following the procedure given in Example 1, 7.7 g. of anthraniloyl-N'-isonicotinoyl hydrazide was reacted with 4.1 ml. of cyclohexanone in 100 ml. of toluene. Recrystallized from methanol-ether, the pure 2,2-pentamethylene-2,3-dihydro-3-isonicotinoylamino-4(1H)-quinazolinone thus prepared melted at 232.0°–235.0°C. (corr.).

EXAMPLE 8

2,10-Dioxo-4a-methyl-1,2,3,4,4a,5,10,10a-octahydropyridazino-[3,2-b]quinazoline — Following the procedure given in Example 1, 15.12 g. of anthraniloyl hydrazide, 11.62 g. of levulinic acid and a crystal of -p-toluenesulfonic acid in 700 ml. of benzene were refluxed under a water trap. Recrystallized from absolute alcohol, the pure 2,10-dioxo-4a-methyl-1,2,3,4,4a,5,10,10a-octahydropyridazino-[3,2-b]quinazoline melted at 194.2°–196.0°C. (corr.).

EXAMPLE 9

2,10-Dioxo-3,4-benzo-1,2,4a,5,10,11-hexahydropyridazino-[3,2-b]quinazoline — A solution containing 15.12 g. of anthraniloyl hydrazide and 15 g. of phthalaldehydic acid in 250 ml. of absolute alcohol were refluxed for 3 hours. The reaction solution was concentrated, and a yellow precipitate settled out. Recrystallized from tetrahydrofuran-hexane, the pure 2,10-dioxo-3,4-benzo-1,2,4a,5,10,11-hexahydropyridazino-[3,2-b]quinazoline thus prepared melted at 240.2°–244.6°C. (corr.).

EXAMPLE 10

1,5-Dioxo-4-dimethylamino-3a-methyl-1,2,3,3a-tetrahydropyrrolo-[1,2-a]quinazoline — Following the procedure given in Example 1, 8.96 g. of 1,1-dimethyl-2-anthraniloyl hydrazide and 5.81 g. of levulinic acid were refluxed in 200 ml. of benzene under a water trap. When no more water was produced by the reaction, the reaction solution was filtered and evaporated under vacuum. The yellow oil which resulted was crystallized from ether. The 1,5-dioxo-4-dimethylamino-3a-methyl-1,2,3,3a-tetrahydrobromo-[1,2-a]quinazoline thus prepared melted at 189.2°–190.0°C. (corr.).

EXAMPLE 11

A. 1-(2-Amino-5-bromobenzoyl)-2-(2,5-dichlorophenyl)hydrazine — A solution containing 24.1 g. of 6-bromoisatoic anhydride and 17.8 g. of 2,5-dichlorophenyl-hydrazine in 120 ml. of ethanol was refluxed until the evolution of carbon dioxide stopped (about 2 hours). The resulting reaction mixture was filtered, and the filtrate cooled whereupon the white crystalline product separated. The product was collected and recrystallized from benzene-ether to yield 1-(2-amino-5-bromobenzoyl)-2-(2,5-dichlorophenyl)-hydrazine, m.p. 191°C.

B. 3-(2,5-Dichloroanilino)-6-bromo-2,2-pentamethylene-2,3-dihydro-4(1H)-quinazolinone - 1-(2-Amino-5-bromobenzoyl)-2-(2,5-dichlorophenyl)-hydrazine was reacted with cyclohexanone according to the procedure given in Example 1 to give 3-(2,5-dichloroanilino)-6-bromo-2,2-pentamethylene-2,3- dihydro-4(1H)-quinazolinone which melted at 263°–266°C. after crystallization from benzene.

EXAMPLE 12

A. 1-(2-Amino-5-bromobenzoyl)-2-(4-chlorophenyl)hydrazine — Following the procedure given in Example 11A, 6-bromoisatoic anhydride was reacted with 4-chlorophenylhydrazine to give 1-(2-amino-5-bromobenzoyl)-2-(4-chlorophenyl)hydrazine which melted at 178°–180°C.

B. 3-(4-Chloroanilino)-6-bromo-2,3-dihydro-2,2-pentamethylene-4(1H)-quinazolinone — Following the procedure given in Example 1, cyclohexanone was reacted with 1-(2-amino-5-bromobenzoyl)-2-(4-chlorophenyl)hydrazine to give 3-(4-chloroanilino)-6-bromo-2,3-dihydro-2,2-pentamethylene-4(1H)-quinazolinone.

EXAMPLE 13

3-Amino-2,2-pentamethylene-2,3-dihydro-4(1H)-quinazolinone — Following the procedure given in Example 1, anthraniloyl hydrazine was reacted with cyclohexanone to give 3-amino-2,2-pentamethylene-2,3-dihydro-4(1H)-quinazolinone.

EXAMPLE 14

3-Dimethylamino-2,3-dihydro-spiro[quinazoline-2,4'-(1'-methyl)piperidine]-4(1H)one — Following the procedure given in Example 5, 3-dimethylamino-2,3-dihydro-spiro[quinazoline-2,4'-(1'-methyl)piperidine]-4(1H)one was prepared from 1-methyl-4-piperidone and 1-(2-aminobenzoyl)-2,2-dimethylhydrazine. The product melted at 130°–132°C. after crystallization from ether.

EXAMPLE 15

3-(4-Nitroanilino)-2,2-pentamethylene-6-bromo-2,3-dihydro-4(1H)-quinazolinone — The reaction of 1-(2-amino-5-bromobenzoyl)-2-(4-nitrophenyl)hydrazine with cyclohexanone according to the procedure given in Example 1 gave 3-(4-nitroanilino)-2,2-pentamethylene-6-bromo-2,3-dihydro-4(1H)-quinazolinone.

EXAMPLE 16

3-Anilino-2,3-dihydro-spiro[quinazoline-2,4'-(2', 2', 6', 6'-tetramethyl)piperidine]-4(1H)one — Following the procedure given in Example 5, 2,2,6,6-tetramethyl-4-piperidinone was reacted with 2-anthraniloyl phenylhydrazide to give 3-anilino-2,3-dihydro-spiro[quinazoline-2,4'-(2', 2', 6', 6'-tetramethyl)piperidine]-4(1H)one.

EXAMPLE 17

1-(4-Methylmercaptophenyl)-2,2-trimethylene-3-n-hexylamino-2,3-dihydro-4(1H)-quinazolinone is prepared from cyclobutanone and 1-n-hexyl-2-[2-(4-methylmercaptoanilino)benzoyl]-hydrazine according to the procedure given in Example 1. The 1-n-hexyl-2-[2-(4-methylmercaptoanilino)benzoyl]hydrazine is prepared from methyl N-(4-methylmercaptophenyl)anthranilate and n-hexylhydrazine.

EXAMPLE 18

2,2-Hexamethylene-3-cycloheptylidine-6-nitro-2,3-dihydro-4(1H)-quinazolinone — The reaction of 5-nitroanthraniloyl hydrazide with excess cyclohepta-none is carried out to give 2,2-hexamethylene-3-cycloheptylidene-6-nitro-2,3-dihydro-4(1H)-quinazolinone. The 5-nitroanthraniloyl hydrazide is prepared from methyl 5-nitroanthyranilate and hydrazine hydrate.

Employing procedures described in the above examples, the following compounds (Examples 19–23) are prepared from 1,1-dimethyl-3-anthraniloyl hydrazide and the appropriate cyclic ketone in equimolecular proportions:

19. 3-Dimethylamino-2,3-dihydro-spiro[quinazoline-2,4'-tetrahydropyran]-4(1H)-one, from tetrahydropyran-4-one;

20. 3-dimethylamino-2,3-dihydro-spiro[quinazoline-2,4'-tetrahydrothiopyran]-4(1H)-one, from tetrahydrothiopyran-4-one;

21. 3-dimethylamino-2,3-dihydro-spiro[quinazoline-2,4'-piperidine]-4-(1H)-one from 4-piperidone;

22. 3-dimethylamino-2,3-dihydro-2,2-tetramethylene-4(1H)-quinazolinone, from cyclopentanone; and, 23. 3-dimethylamino-2,3-dihydro-2,2-hexamethylene-4(1H)-quinazolinone, from cycloheptanone.

EXAMPLE 24

2,2-Pentamethylene-3-piperidino-2,3-dihydro-4(1H)-quinazolinone — Isatoic anhydride is caused to react with one molecular equivalent of 1-aminopiperidine by refluxing the mixture in 95 per cent ethanol for 3 hours and cooling the reaction mixture to precipitate 1-(2-aminobenzoylamino)-piperidine. The latter compound is reacted with cyclohexanone to give 2,2-pentamethylene-3-piperidino-2,3-dihydro-4(1H)-quinazolinone of the formula

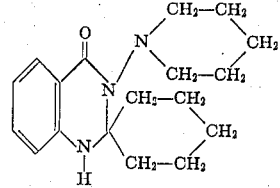

In the same manner from the indicated starting materials, there are prepared the following compounds (Examples 25–28):

25. 2,2-Tetramethylene-3-morpholino-2,3-dihydro-4-(1H)-quinazolinone, from 1-(2-aminobenzoylamino)morpholine and cyclopentanone;

26. 2,2-tetramethylene-3-thiamorpholino-2,3-dihydro-4(1H)-quinazolinone, from 1-(2-aminobenzoylamino)-thiamorpholine and cyclopentanone;

27. 2,2-pentamethylene-3-[1-(4-methylpiperazinyl)-amino)-2,3-dihydro-4(1H)-quinazolinone, from 1-(2-aminobenzoyl-amino]-4-methylpiperazine and cyclohexanone; and 28. 6-bromo-3-hexamethyleneimino-2,2-pentamethylene-2,3-dihydro-4(1H)-quinazolinone, from 1-(5-bromo-2-aminobenzoylamino)hexamethyleneimine and cyclohexanone.

Employing procedures described in the above examples, the following compounds (Examples 29–33) are prepared from anthraniloyl hydrazide and an excess of the appropriate cyclic ketone:

29. 3-(3-Tetrahydrothiopyranylideneamino)-2,3-dihydrospiro[quinazoline-2,3'-tetrahydrothiopyran]-4(1H)-one, from 3-tetrahydrothiopyranone;

30. 3-(3-tetrahydropyranylideneamino)-2,3-dihydrospiro[quinazoline - 2,3' - tetrahydropyran] - 4(1H)-one, from 3-tetrahydropyranone;

31. 3-(1-methyl-3-piperidylideneamino)-2,3-dihydrospiro[quinazoline-2,3'-(1'-methyl)piperidine]-4(1H)-one, from 1-methyl-3-piperidone;

32. 3-(1-methyl-3-pyrrolidylideneamino)-2,3-dihydrospiro[quinazoline-2,3'-(1'-methyl)pyrrolidine]-4(1H)-one, from 1-methyl-3-pyrrolidone; and, 33. 3-(3-tetrahydrofurylideneamino)-2,3-dihydrospiro[quinazoline-2,3'-tetrahydrofuran]-4(1H)-one, from tetrahydrofuran-3-one.

The following compounds (Examples 34–53) are prepared as above from the indicated starting materials, which are either known or can be obtained by known procedures:

34. 3-Anilino-5-ethyl-2,2-tetramethylene-2,3-dihydro-4(1H)-quinazolinone, from 6-ethylanthraniloyl phenyl-hydrazide and cyclopentanone;

35. 3-anilino-6,8-dibromo-2,2-hexamethylene-2,3-dihydro-4(1H)-quinazolinone, from 3,5-dibromoanthraniloyl phenylhydrazide and cycloheptanone;

36. 3-anilino-6-bromo-8-nitro-2,2-tetramethylene-2,3-dihydro-4(1H)-quinazolinone, from 3-nitro-5-bromo-anthraniloyl phenylhydrazide and cyclopentanone;

37. 3-anilino-6,7-dimethoxy-2,2-tetramethylene-2,3-dihydro-4(1H)-quinazolinone, from 4,5-dimethoxyanthraniloyl phenylhydrazide and cyclopentanone;

38. 3-anilino-1-benzyl-2,2'-tetramethylene-2,3-dihydro-4(1H)-quinazolinone, from 2-benzylaminobenzoyl phenyl-hydrazide and cyclopentanone;

39. 3-anilino-1-methyl-6-methanesulfonyl-2,2-tetramethylene-2,3-dihydro-4(1H)-quinazolinone, from 2-methylamino-5-methanesulfonylbenzoyl phenylhydrazide and cyclopentanone;

40. 3-anilino-1-cyclohexyl-6-methylmercapto-2,2-tetramethylene-2,3-dihydro-4(1H)-quinazolinone, from 2-cyclohexylamino-5-methylmercaptobenzoyl phenylhydrazide and cyclopentanone;

41. 3-anilino-1-cyclopropylmethyl-6-ethanesulfinyl-2,2-tetramethylene-2,3-dihydro-4(1H)-quinazolinone, from 2-cyclopropylmethylamino-5-ethanesulfinylbenzoyl phenylhydrazide and cyclopentanone;

42. 3-benzylamino-2,2-pentamethylene-2,3-dihydro-4(1H)-quinazolinone, from 1-(2-aminobenzoyl)-2-benzylhydrazine and cyclohexanone;

43. 3-[2-(4-methoxyphenyl)ethylamino]-2,2-pentamethylene-2,3-dihydro-4(1H)-quinazolinone, from 1-(2-aminobenzoyl)-2-[2-(4-methoxyphenyl)ethyl]hydrazine and cyclohexanone;

44. 3-(4-chlorobenzylamino)-5,7-dichloro-2,2-pentamethylene-2,3-dihydro-4(1H)-quinazolinone, from 1-(2-amino-4,6-dichlorobenzoyl)-2-(4-chlorobenzyl)hydrazine and cyclohexanone;

45. 3-(4-methylanilino)-6-trifluoromethyl-2,2-pentamethylene-2,3-dihydro-4(1H)-quinazolinone, from 1-(2-amino-5-trifluoromethylbenzoyl)-2-(4-methylphenyl)hydrazine and cyclohexanone;

46. 3-(2,4,6-trimethoxyanilino)-2,2-pentamethylene-2,3-dihydro-4(1H)-quinazolinone, from 1-(2-aminobenzoyl)-2-(2,4,6-trimethoxyphenyl)hydrazine and cyclohexanone;

47. 3-(4-methylmercaptoanilino)-2,2-pentamethylene-2,3-dihydro-4(1H)-quinazolinone, from 1-(2-aminobenzoyl)-2-(4-methylmercaptophenyl)hydrazine and cyclohexanone;

48. 3-(4-n-butanesulfonylanilino)-2,2-pentamethylene-2,3-dihydro-4(1H)-quinazolinone, from 1-(2-aminobenzoyl)-2-(4-n-butanesulfonylphenyl)hydrazine and cyclohexanone;

49. 3-(4-ethanesulfinylanilino)-2,2-pentamethylene-2,3-dihydro-4(1H)-quinazolinone, from 1-(2-aminobenzoyl)-2-(4-ethanesulfinylphenyl)hydrazine and cyclohexanone;

50. 4-(2,4-dimethylanilino)-5,7-dimethyl-2,2-pentamethylene-2,3-dihydro-4(1H)-quinazolinone, from 1-(2-amino-4,6-dimethylbenzoyl)-2-(2,4-dimethylphenyl)hydrazine and cyclohexanone;

51. 3-[3-(3,4-dimethoxyphenyl)propylamino]-2,2-pentamethylene-2,3-dihydro-4(1H)-quinazolinone, from 1-(2-aminobenzoyl)-2-[3-(3,4-dimethoxyphenyl)propyl]hydrazine and cyclohexanone;

52. 3-(3-trifluoromethylanilino)-2,2-pentamethylene-2,3-dihydro-4(1H)-quinazolinone, from 1-(2-aminobenzoyl)-2-(3-trifluoromethylphenyl)hydrazine and cyclohexanone; and, 53. 3-(3-trifluoromethylbenzylamino-2,2-pentamethylene-2,3-dihydro-4(1H)-quinazolinone, from 1-(2-aminobenzoyl)-2-(3-trifluoromethylbenzyl)hydrazine and cyclohexanone.

The compounds of the invention possess the inherent applied use characteristics of exerting pharmacological effects in animal organisms, e.g., barbiturate potentiating properties, as evidenced by known pharmacological evaluation procedures, thus indicating their usefulness as sedatives, e.g., as adjuvants in the treatment of insomnia, convulsions, and mental disturbances.

The barbiturate potentiation activity of the quinazolinones of the invention was measured in mice generally according to the standard procedure of Wylie, Proc. Soc. Exp. Biol. Med. 98, 716 (1958), as follows: Groups of 10 mice each are medicated (10 and 100 mg./kg. or higher, intraperitoneally or orally) and 40 or 90 minutes later injected with sodium hexobarbital (40 mg./kg. intraperitoneally). Loss of righting reflex of each animal is checked at 10, 15 and 20 minutes after injection of sodium hexobarbital. Test compounds active at 100 and/or 10 mg./kg. are tested at other doses or if inactive at 100 mg./kg. at higher doses, for calculation of $ED_{50}$, i.e., the effective dose required to produce 50 percent potentiation of sodium hexobarbital. When tested by this procedure, the compounds of the invention were found to have $ED_{50}$ values of about 200 mg./kg.

The actual determination of the numerical biological data definitive for a particular compound is readily obtained by standard test procedures, referred to above, by technicians versed in pharmacological test procedures, without any need for any extensive experimentation.

The quinazolinones of the invention can be prepared for use by conventional pharmaceutical procedures: that is, by dissolving or suspending them in a pharmaceutically acceptable vehicle, e.g., aqueous alcohol, glycol, oil solution, or oilwater emulsion, for parenteral or oral administration; by incorporating them in unit dosage form as tablets or capsules for oral administration either alone or in combination with conventional adjuvants, e.g., calcium carbonate, starch, lactose, talc, magnesium stearate, gum acacia, and the like. Optionally, the compounds of the invention can be used in combination with conventional sedative agents.

We claim:
1. A compound of the formula

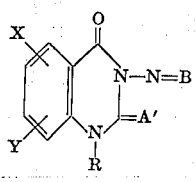

wherein:
B is
1. any pair of the monovalent groups R,
2. a divalent group A', or
3. the group =C=A';
R is H, lower-alkyl, lower-alkenyl, three to eight-ring carbon cycloalkyl, three to eight ring carbon cycloalkyl-lower-alkyl, Ar, or Ar-lower-alkyl where Ar is phenyl or phenyl substituted by from one to three substituents selected from lower-alkyl, lower-alkoxy, lower-alkylmercapto, lower-alkanesulfinyl, lower-alkanesulfonyl, halogen, nitro or trifluoromethyl, wherein cycloalkyl in both occurrences has no more than eight carbon atoms;
' is polymethylene, azapolymethylene, N-lower-alkyl-azapolymethylene, oxapolymethylene, or thiapolymethylene each containing from three to eight carbon atoms; and,
X and Y are each H, lower-alkyl, lower-alkoxy, lower-alkylmercapto, lower-alkanesulfinyl, lower-alkanesulfonyl, halogen, nitro or trifluoromethyl.

2. A compound in accordance with claim 1 wherein B is di-(lower alkyl), A' is polymethylene containing three to eight ring atoms, and R, X and Y are each hydrogen.

3. A compound in accordance with claim 1 wherein B is the pair Ar and hydrogen, A' is polymethylene containing three to eight ring atoms, and R, X and Y are each hydrogen.

4. A compound in accordance with claim 1 wherein B is $H_a$, A' is N-lower-alkyl-azatetramethylene, and R, X and Y are each hydrogen.

5. 2,2-Pentamethylene-2,3-dihydro-3-anilino-4(1H)-quinazolinone, in accordance with claim 1 wherein B is the pair hydrogen and Ar, A' is $(-CH_2-)_5$, and R, X and Y are each hydrogen.

6. 2,10-Dioxo-4a-methyl-1,2,3,4,4a,5,10,10a-octahydropyridazino[3,2-b]quinazoline.

7. 2,10-Dioxo-3,4-benzo-1,2,4a,5,10,11-hexahydro-pyridazino[3,2-b]quinazoline.

8. 1,5-Dioxo-4-dimethylamino-3a-methyl-1,2,3,3a-tetrahydropyrrolo[1,2-a]quinazoline.

9. 3-Amino-2,3-dihydro-spiro[quinazoline 2,4'-(1'-methyl)piperidine]-4(1H)-one in accordance with claim 4.

10. 3-(2,5-Dichloroanilino)-6-bromo-2,2-pentamethylene-2,3-dihydro-4(1H)-quinazolinone in accordance with claim 1.

11. 2,2-Pentamethylene-2,3-dihydro-3-isonicotinoyl-amino-4(1H)-quinazolinone.

12. 2,2-Pentamethylene-3-dimethylamino-2,3-dihydro-4(1H)-quinazolinone in accordance with claim 2.

13. 6-Bromo-2,2-pentamethylene-3-anilino-2,3-dihydro-4(1H)-quinazolinone in accordance with claim 1.

14. 2.2-Pentamethylene-3-cyclohexylamino-2,3-dihydro-4(1H)-quinazolinone in accordance with claim 1.

15. 2.2-Pentamethylene-3-cyclohexylidenamino2,3-dihydro-4(1H)-quinazolinone in accordance with claim 1.

16. 3-Dimethylamino-2,3-dihydro-spiro[quinazoline-2,4'-(1'-methyl)piperidine]-4(1H) one in accordance with claim 1.

* * * * *

UNITED STATES PATENT AND TRADEMARK OFFICE
CERTIFICATE OF CORRECTION

PATENT NO. : 3,843,654
DATED : October 22, 1974
INVENTOR(S) : Andrew W. Zalay

It is certified that error appears in the above—identified patent and that said Letters Patent are hereby corrected as shown below:

Column 1, line 57, "-CH-" should read -- $-CH_2-$ --; line 58, omit "$_2$", first occurrence, and "-CH-" should read -- $-CH_2-$ --; line 59, omit "$_2$", first occurrence and "-CH-" should read -- $-CH_2-$ --; line 60, omit "$_2$", first occurrence.

Column 11, line 24 of Claim 1, " ' " should read -- A' --.

Column 12, Claim 4, line 2, "$H_a$" should read -- $H_2$ --.

Column 12, Claim 14, line 29, "2.2" should read -- 2,2 --.

Column 12, Claim 15, line 32, "2.2" should read -- 2,2 --; and, "cyclohexylidenamino2,3-" should read -- cyclohexylidenamino-2,3- --.

Column 12, Claim 16, line 36, "-4(1H) one" should read -- -4(1H)one --.

Signed and Sealed this

Sixteenth Day of November 1976

[SEAL]

Attest:

RUTH C. MASON
*Attesting Officer*

C. MARSHALL DANN
*Commissioner of Patents and Trademarks*